May 19, 1959  B. F. BREGI  2,886,990
APPARATUS FOR ROLLING GEARS
Filed Aug. 30, 1954  5 Sheets-Sheet 1

INVENTOR.
BENJAMIN F. BREGI
BY Whittemore,
Hulbert & Belknap
ATTORNEYS

May 19, 1959     B. F. BREGI     2,886,990
APPARATUS FOR ROLLING GEARS

Filed Aug. 30, 1954     5 Sheets-Sheet 3

INVENTOR.
BENJAMIN F. BREGI
BY *Whittemore,*
*Hulbert & Belknap*
ATTORNEYS

May 19, 1959 B. F. BREGI 2,886,990
APPARATUS FOR ROLLING GEARS
Filed Aug. 30, 1954 5 Sheets-Sheet 4
FIG. 9.
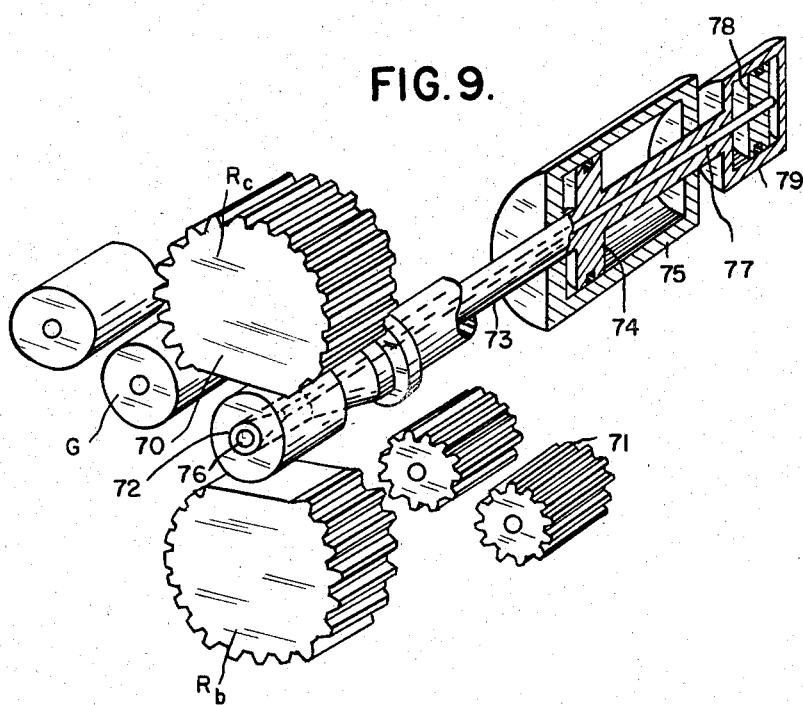
FIG. 16.
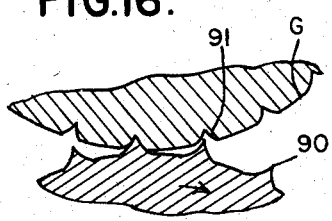
FIG. 17.
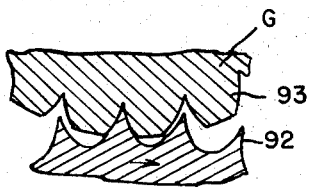
FIG. 18.
INVENTOR.
BENJAMIN F. BREGI
BY
ATTORNEYS May 19, 1959　　　　　B. F. BREGI　　　　2,886,990
APPARATUS FOR ROLLING GEARS
Filed Aug. 30, 1954　　　　　　　　　　5 Sheets-Sheet 5
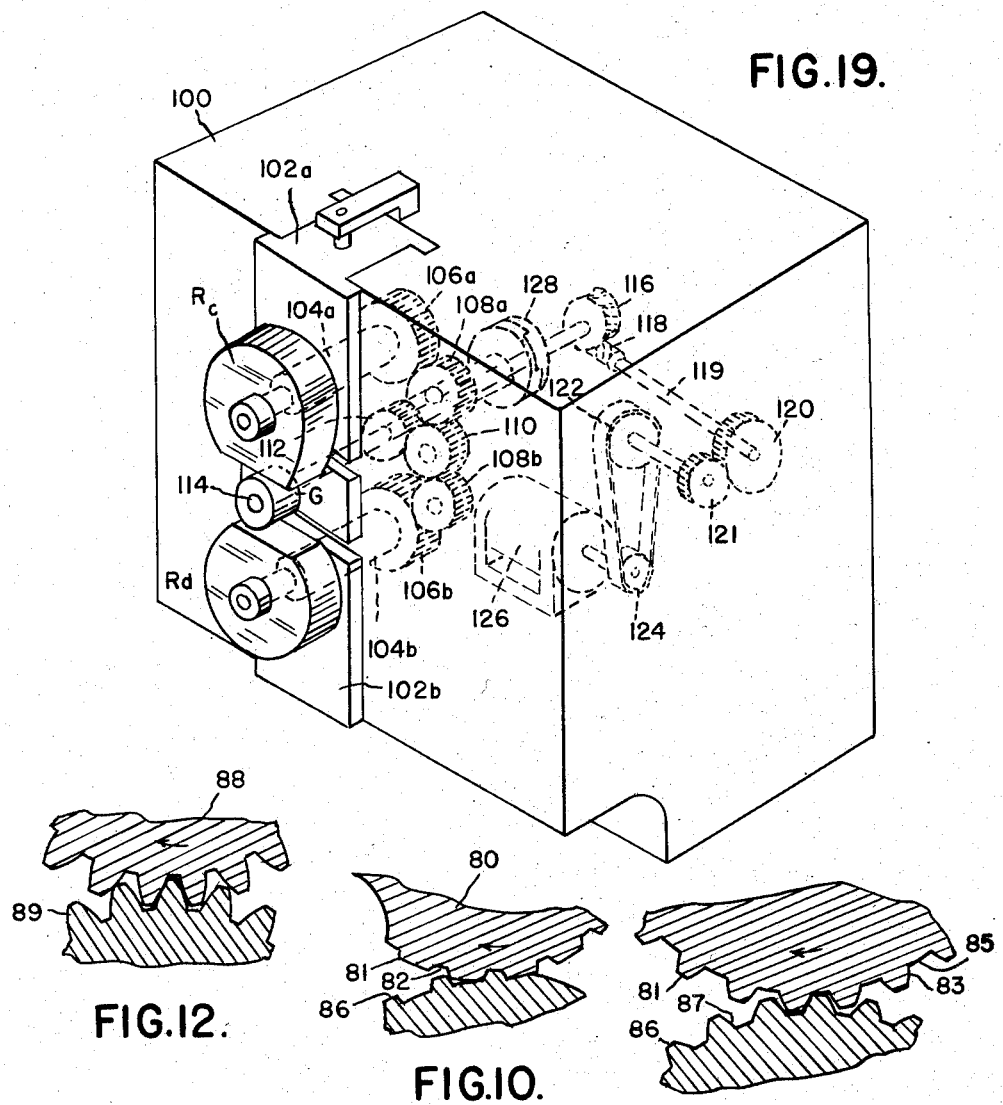
FIG.19.
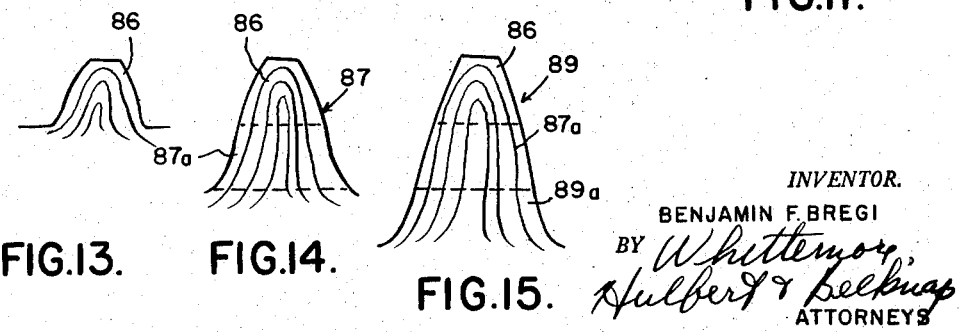
FIG.12.　　FIG.10.　　FIG.11.
FIG.13.　FIG.14.　FIG.15.
INVENTOR.
BENJAMIN F. BREGI
BY Whittemore,
Hulbert & Belknap
ATTORNEYS United States Patent Office 2,886,990
Patented May 19, 1959

2,886,990

APPARATUS FOR ROLLING GEARS

Benjamin F. Bregi, Grosse Pointe Park, Mich., assignor to National Broach & Machine Company, Detroit, Mich., a corporation of Michigan Application August 30, 1954, Serial No. 453,075

4 Claims. (Cl. 80—16)

The present invention relates to method and apparatus for rolling gears.

It is an object of the present invention to provide a method and apparatus for forming teeth on gear blanks by rolling the blanks in conjunction with gear-like rolling tools.

More specifically, it is an object of the present invention to provide apparatus for forming gear teeth comprising a pair of laterally spaced gear-like forming members, means for rotating the members in timed relation, the members having recesses at the sides thereof adapted to contain a gear blank and having progressively stepped sets of teeth to perform a gear rolling operation in a single rotation of each of the forming members.

It is a further object of the present invention to provide apparatus as described in the preceding paragraph in conjunction with means providing for adjustment of the forming members toward and away from each other in order to produce gears of different size using the same forming rolls.

It is a further object of the present invention to provide apparatus as described in the foregoing paragraphs in conjunction with means for preheating the gear blanks to facilitate tooth formation by a rolling operation.

Other objects and features of the invention will become apparent as the description proceeds, especially when taken in conjunction with the accompanying drawings, wherein:

Figure 9 is a diagrammatic view showing continuously operating apparatus for rolling a series of gear blanks.

Figures 10, 11 and 12 are diagrammatic views showing successive steps in a typical gear rolling operation.

Figures 13, 14 and 15 are views illustrating the progressive formation of gear teeth by the steps illustrated in Figures 10-12.

Figures 16, 17 and 18 are views illustrating the sequence of steps employing tooth forming elements of modified shape.

Figure 19 is a view of the simplified machine for carrying out the gear rolling operation.

Figure 1:
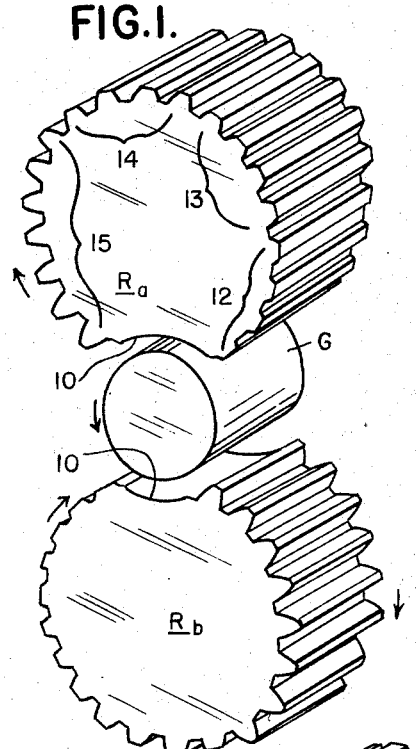
Figure 1 is a diagrammatic view illustrating the relationship between a pair of forming rolls and a gear blank.

In Figure 1 there is illustrated a gear blank G disposed between a pair of forming rolls $R_a$ and $R_b$. The rolls $R_a$ and $R_b$ are provided with arcuate cut-off portions indicated at 10 which are adapted to register with and to receive the gear blank G. Each of the rolls $R_a$ and $R_b$ has sets of gear teeth designated respectively at 12, 13, 14 and 15, the sets being progressively higher in the direction of rotation, as indicated by the arrows in the figure. It will be appreciated of course that the number of teeth in each set will be at least equal to half the number of teeth to be provided in the work gear and that the arcuate extent of each set of teeth will be at least equal to half the circumference of the work piece. Preferably, the final set 15 of each of the rolls contains a number of full size teeth at least equal to the total number of teeth on the work piece so as to true up any imperfection which might otherwise result from lack of exactly true relationship between the separate rolls $R_a$ and $R_b$.

With the parts in the relationship illustrated in Figure 1, the forming rolls and the work piece are rotated in properly timed relation in the direction of the arrows. The teeth in set 12 of both rolls form impressions or shallow indentations or partial teeth on the periphery of the work gear, and the sets 13, 14 and 15 progressively extend these teeth to final finished form. When the rolls again reach the illustrated position, or in other words have rotated through 360 degrees, a completely finished work gear will occupy the space intermediate the recesses 10.

Figure 2:
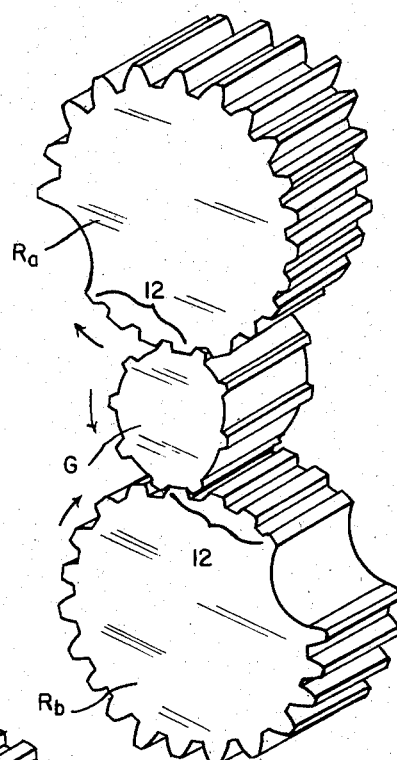
Figure 2 is a diagrammatic view similar to Figure 1 showing the parts in an intermediate phase of the rolling operation.

In Figure 2 the partially completed work gear G is illustrated in contact with the rolls $R_a$ and $R_b$ at a time when the final tooth of the initial set 12 of each roll is operative.

Figure 3:
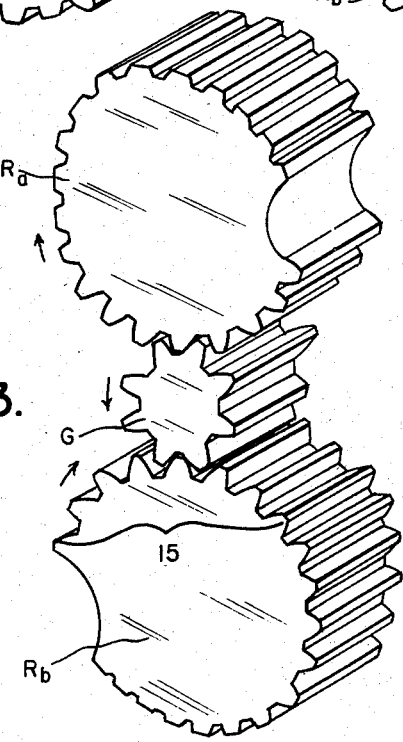
Figure 3 is a view similar to Figure 2 showing the parts in a further advanced phase of the rolling operation.

In Figure 3 the practically completed gear G is illustrated in association with the rolls $R_a$ and $R_b$ at a time when the final finishing set 15 of teeth is operative.

Figure 4:
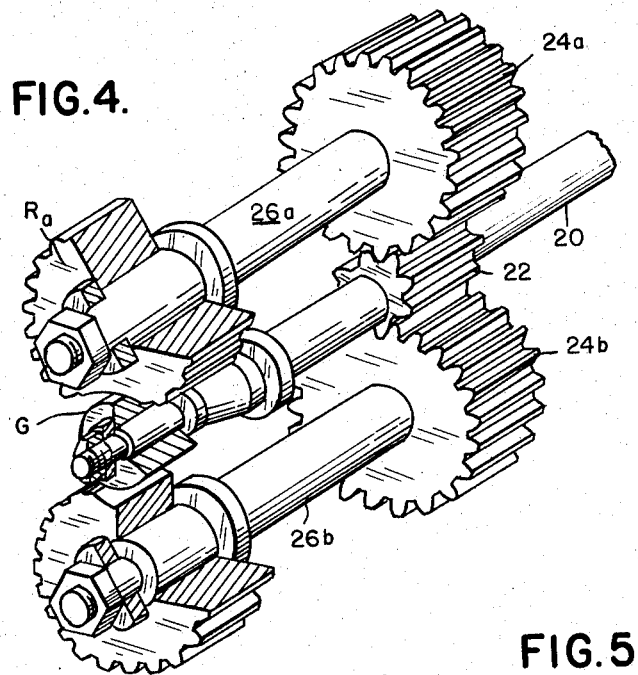
Figure 4 is a diagrammatic view showing means for driving the forming rolls in timed relation to rotation of the work supporting means.

During the final formation of the partial teeth on the gear blank G it is essential that the rolls $R_a$ and $R_b$ be driven in properly timed relationship with respect to the gear G. In Figure 4 mechanism for accomplishing this result is illustrated as comprising a shaft 20 having a master pinion 22 thereon meshing with master gears 24a and 24b carried respectively by shafts 26a and 26b which in turn carry the rolls $R_a$ and $R_b$. While it is essential to insure accurately timed relationship between rotation of the gear blank G and the rolls $R_a$ and $R_b$ during the initial rolling operation, it is desirable for the final rolling operation, which is accomplished by the full size sets 15 of teeth on the rolls, to take place while the timed relationship between the rolls $R_a$ and $R_b$ and the gear blank G is maintained solely by the rolling engagement between the teeth on the rolls $R_a$ and $R_b$ and the teeth being formed on the gear blank G. For this purpose the teeth on the master gears 24a and 24b which are in alignment with the teeth of the finishing sets of teeth 15 on the rolls $R_a$ and $R_b$, are relatively thin, or in other words are provided with substantial backlash when they mesh with the teeth of the pinion 22. In this way the gears are maintained generally in timed relationship but during the final rolling operation the accuracy of the teeth being rolled on the work blank is dependent solely on the accuracy of the teeth of the finishing sets of the master rolls and errors are not developed as a result of the operation of timing gears at this time.

Figure 5:
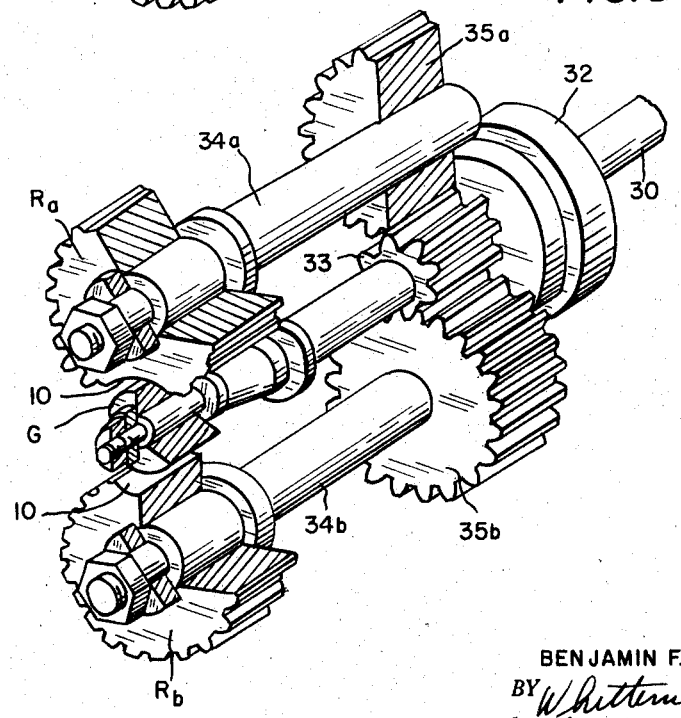
Figure 5 is a diagrammatic view illustrating clutch means for disconnecting the timed drive to the forming rolls.

Referring now to Figure 5 a modified construction for obtaining the result above described is illustrated. In this figure there is provided a drive shaft 30 having a clutch device 32 associated therewith adapted to couple the master pinion 33 to the shaft 30 when the clutch is energized. Carried on the forward end of the shaft 30 is the work gear G. Associated with the work gear are a pair of forming rolls $R_a$ and $R_b$ which may be identical with those previously described, and these forming rolls are mounted on shafts 34a and 34b respectively. Carried by the shafts 34a and 34b are master gears 35a and 35b which are in mesh with the pinion 33. With this construction the operation is carried out as follows: Rotation is imparted to the drive shaft 30 while the clutch 32 is engaged thereby effecting rotation of the pinion 33 and through the master gears 35 and 35b, effecting properly timed rotation of the rolls $R_a$ and $R_b$ in accordance with rotation of the work blank G. The rolls $R_a$ and $R_b$ are illustrated in their initial position in which the work gear G occupies the arcuate recesses 10. As soon as the rolls $R_a$ and $R_b$ have been rotated to a point where the final finishing set of gear teeth becomes operative on the work blank G, the clutch 32 is disengaged by suitable means and thereafter rotation of the rolls $R_a$ and $R_b$ is dependent solely upon the drive imparted thereto by the partially finished work gear G. Rotation of the work gear is interrupted when the completed gear occupies the arcuate recesses 10 in the rolls, at which time the completed gear may be withdrawn and a work blank substituted therefor.

Figure 6:
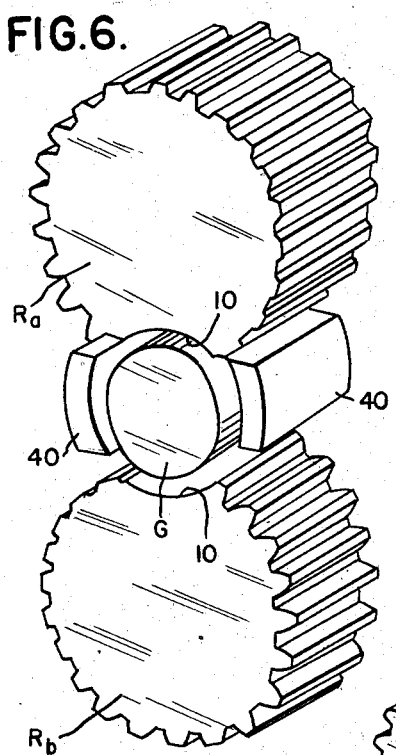
Figure 6 is a diagrammatic view illustrating a device for preheating the gear blank prior to commencement of the rolling operation.

While the present operation is in many cases effective to produce satisfactory gear teeth as a result of cold rolling, in some cases it may be desirable to heat the work gears G prior to the rolling operation. In Figure 6 there is illustrated a work gear G received in the arcuate recesses 10 between rolls $R_a$ and $R_b$, and in this figure the parts may be assumed to be connected to the drive mechanism illustrated in Figure 5. Intermediate the rolls $R_a$ and $R_b$ and closely adjacent the sides of the gear blank G, are a pair of induction heating elements 40. The operation in this case may be accomplished by energizing the induction heating elements 40 while the gear blank G is rotated prior to engagement of the clutch 32 illustrated in Figure 5. As soon as the gear blank has been brought to the required temperature, the clutch is engaged and the rolling cycle initiated. It is pointed out that since the operation is in the rolling of teeth in the periphery of the gear blank, it is necessary only to produce heating to a relatively shallow depth so that the heating operation may be relatively brief.

Figure 7:
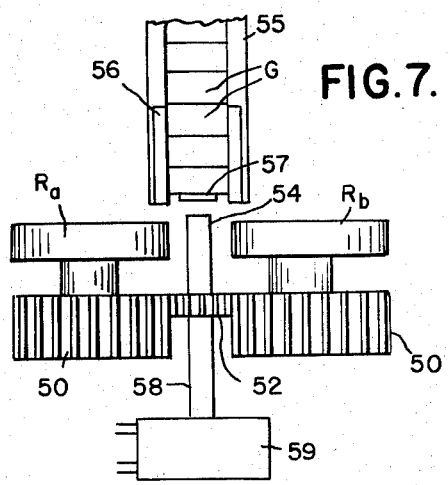
Figure 7 is a diagrammatic view illustrating another manner of effecting preheating of the gear blanks.

In Figure 7 there is illustrated a modified arrangement in which rolls $R_a$ and $R_b$ are disposed with their axes vertical and are associated with master gears 50 which respectively mesh with a master pinion 52. Extending upwardly from the master pinion 52 is a work support 54 adapted to receive one of a plurality of gear blanks G maintained in a vertically disposed magazine 55 the lower portion of which may comprise an induction heating device 56. Means for supporting the gears G in the magazine is diagrammatically illustrated at 57 and may be adapted to release the gears one at a time to be supported on the work support 54. The master pinion 52 may be associated with a piston rod 58 connected to a piston received in a cylinder 59 so that after the rolling operation is completed the completed gear may be lowered to a plane below that occupied by the rolls $R_a$ and $R_b$ and released from the work support 54 and transferred laterally by suitable means. In this case rotation may be imparted to the master pinion 52 or to either of the master gears 50 by suitable means, and the means which permits the teeth of the partially formed gear to control the relative rotation with respect to the rolls during the final rolling of the gear teeth may be by the provision of relatively thin teeth in the master gears 50 in alignment with the final finishing set of teeth in the rolls $R_a$ and $R_b$.

Figure 8:
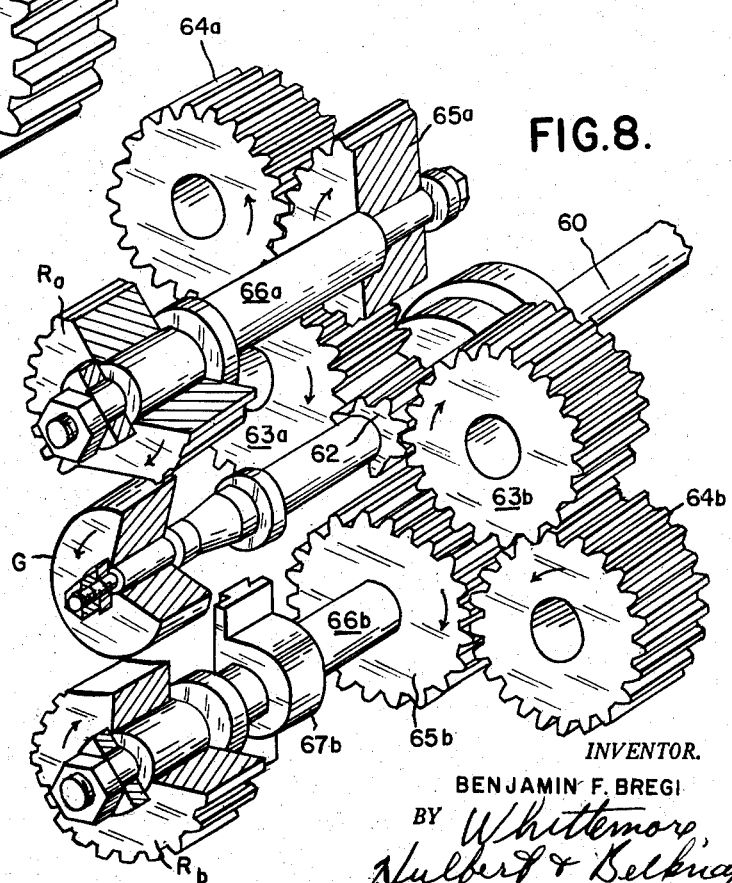
Figure 8 is a diagrammatic view illustrating mechanism for providing adjustment of the forming rolls toward and away from each other to effect rolling operations on gear blanks of different size.

Referring now to Figure 8 there is diagrammatically illustrated an arrangement which permits the rolls $R_a$ and $R_b$ to be moved radially toward and away from the gear blank G so as to permit rolling gears of different sizes. In this case the gear blank G is supported on a shaft 60 carrying a master pinion 62 thereon which meshes respectively with change gears 63a, 63b, 64a, 64b, and 65a and 65b, the latter two being connected to shafts 66a and 66b which carry the rolls $R_a$ and $R_b$ respectively. Suitable slide means are provided such as indicated diagrammatically at 67b for both the shafts 66a and 66b and by adjustment of the shaft 66a and 66b toward and away from each other and by the selection of proper change gears, the same apparatus may be employed to roll gears of substantially different diameter.

Referring now to Figure 9 there is illustrated diagrammatically apparatus for the continuous production of gears. In this case modified rolls $R_c$ and $R_d$ are illustrated which instead of being provided with the arcuate recesses 10 disclosed in the previous embodiments are provided with substantially flat portions 70 which permit gear blanks G to be inserted laterally between the rolls and the completed gears, as illustrated at 71, to be moved laterally outwardly from between the rolls. In this case the means for supporting a gear blank G between the rolls $R_c$ and $R_d$ comprises an expanding arbor indicated generally at 72, the arbor being carried by a piston rod 73 connected to a piston 74 reciprocable within a cylinder 75. The expanding arbor includes a tapered wedge indicated at 76 of conventional type adapted to be actuated by a draw rod 77 connected to a piston 78 received within the arbor clamping cylinder 79. Gear blanks G may be advanced by suitable means such for example as a track, into position between the rolls $R_c$ and $R_d$ at which time actuation of the cylinder 75 advances the arbor into the opening in the gear blank. Actuation of the arbor clamping cylinder 79 expands the arbor and retains the gear blank on the arbor. With the gear blank thus rigidly supported on the arbor intermediate the rolls $R_c$ and $R_d$, timed rotation is imparted to the gear support and the rolls by suitable means which may be any of the means previously described, until the rolls $R_c$ and $R_d$ have made a complete 360 degrees rotation. At this time the gear blank has had teeth completely formed thereon. Fluid is exhausted from the arbor clamping cylinder and the arbor moving cylinder 75 is energized to retract the arbor, leaving the completed gear intermediate the rolls $R_c$ and $R_d$. Advance of the next succeeding gear blank G into the space between the rolls displaces the finished work gear.

Referring now to Figures 10, 11 and 12 there is illustrated one manner of producing teeth in the rolling operation. In Figure 10 there is shown a section of a roll 80 having teeth 81 leaving tooth spaces 82 therebetween having a shape corresponding to the upper portion desired on the teeth to be produced on the gear blank G.

In Figure 11 there is shown a second or successive section of teeth 83 in which the teeth are dimensioned and spaced to leave tooth spaces 85 which will have the effect of displacing the partially formed teeth 86 of the gear blank outwardly to the tooth form shown at 87 without substantial working of the top portion of the teeth as produced by section 80 of the roll. In like manner, a third, subsequent or final section 88 of the roll will have teeth formed to displace the partially formed teeth 87 outwardly to final form as illustrated at 89.

This operation is perhaps more readily apparent from a consideration of Figures 13–15. In Figure 13 the partially formed tooth 86 is illustrated. In Figure 14 the tooth 87 is illustrated and it will be appreciated that the tooth 87 includes the previously formed tooth portion 86 without substantial distortion to which has been added a lower portion 87a. In Figure 15 there is illustrated the final tooth form 89 which it will be recognized is made up of the initial tooth portion 86, the intermediate tooth portion 87a, and a final tooth portion 89a. While for simplicity this operation has been illustrated as comprising three steps, it will of course be appreciated that in many cases the rolls will be provided with a relatively larger number of sets of teeth so that the teeth on the gear will be formed in a number of steps exceeding three. However, the essential point illustrated by these figures is that in this operation the top of the tooth is initially formed in the first operation and is not necessarily reworked, but instead is displaced radially outwardly by forming more metal into the base or root portion of the teeth.

Referring now to Figures 16–18 there is illustrated a somewhat different approach to the problem of displacing the metal of the gear blank into tooth form. In this case, in Figure 16 there is illustrated a roll having a set of teeth 90 which are essentially pointed and which form relatively widely spaced recesses 91 in the periphery of the gear blank G. In this case it will be observed that the first operation does not in any sense complete the top portion of the teeth of the gear on the blank, but instead merely starts the flow of metal from portions of the blank circumferentially thereof into what will become the finished tooth in the final operation.

In Figure 17 there is illustrated an intermediate operation in which the roll is provided with relatively narrow teeth 92 designed to extend the tooth spaces on the gear blank to substantially full depth without at this time having formed the teeth 93 on the gear G to proper tooth form.

In Figure 18 the final operation is illustrated as rolling the gear blank G with teeth 94 on the roll of full tooth form and in this operation the partially finished teeth 93 resulting from the operation illustrated in Figure 17 are shaped to the final desired form by an operation which includes displacing metal laterally inwardly and thereby causing a radially outward flow of metal into the final tooth form.

Referring now to Figure 19 there is illustrated a simple machine for carrying out the rolling operation. The machine comprises a frame 100 provided with vertical slides 102a and 102b carrying shafts 104a and 104b respectively on which the rolls $R_c$ and $R_d$ are mounted. Carried at the opposite end of the shafts 104a and 104b are change gears 106a and 106b respectively, which connect through change gears 108a and 108b to a common drive gear 110 which meshes with the master pinion 112 rotatably mounted on a work spindle 114. The work spindle 114 has a worm gear 116 thereon adapted to be driven by a worm 118 carried by a shaft 119 driven through gears 120 and 121 from a pulley 122 connected to a drive pulley 24 of a motor 126. Mounted on the shaft 114 is a clutch 128 operably connected to the pinion 112 so as to connect the pinion for rotation with the shaft 114 during initial rolling of the work gear G and to disconnect the drive means during final rolling by the rolls $R_c$ and $R_d$ all as previously described.

While for simplicity the drawings illustrate the gears produced by the present method and apparatus as spur gears, it will be appreciated that the method is equally applicable in the production of helical gears which will result when the toothed rolls are provided with helical teeth.

The drawings and the foregoing specification constitute a description of the improved method and apparatus for rolling gears in such full, clear, concise and exact terms as to enable any person skilled in the art to practice the invention, the scope of which is indicated by the appended claims.

What I claim as my invention is:

1. Apparatus for forming teeth on the peripheries of gear blanks by rolling comprising a first rotary means in the form of a plurality of gear-like rolls having progressively stepped teeth on their periphery and having recessed peripheral sections adapted to receive a gear blank or finished gear without interference, means for supporting said rolls for rotation without lateral movement, a second rotary means in the form of a gear blank arbor between said rolls, positive drive means for rotating said first and second rotary means in timed relation, and means for disconnecting the positive drive of one of said rotary means during completion of a single rotation of said rolls.

2. Gear rolling apparatus comprising a pair of toothed rolls having peripheral recesses for receiving a gear blank, an arbor for supporting a gear blank intermediate said rolls in said recesses, positive drive means for rotating said rolls through less than a complete rotation, positive drive means for rotating said arbor a corresponding amount and for thereafter driving said arbor directly and effecting rotation of said rolls solely through engagement between a gear blank and said rolls to complete a single rotation of said rolls and to thereby finish teeth on a gear blank.

3. A roll for forming teeth on a gear blank, said roll comprising a generally cylindrical body provided with a plurality of sets of forming teeth, each set being stepped progressively higher than the next set in the direction opposite to the direction of advance, and each of said sets except the final set having a number of teeth equal to about one-half the number of teeth on the gear blank, said final set having a number of teeth at least equal to the number of teeth on the blank, said roll having on its periphery intermediate the initial and final set of forming teeth a recessed gap dimensioned to receive either a gear blank or finished work gear without interference.

4. Gear rolling apparatus comprising a pair of rolls having sets of teeth, the teeth of each set being identical, the teeth of successive sets being shaped to progressively roll teeth to final form on a blank, the final set of teeth in the rolls being conjugate to the desired form of teeth on the blank, shafts supporting said rolls, a blank supporting shaft intermediate said roll supporting shafts, master gears on said roll supporting shafts, a master pinion on said blank supporting shaft in mesh with said master gears, means for driving one of said shafts directly, the teeth on said master gears and pinion being shaped to be in tight mesh while the teeth of the initial sets on said rolls contact said blank and being shaped to provide backlash when the final sets of teeth of said rolls are in contact with said blank.

References Cited in the file of this patent

UNITED STATES PATENTS

| | | |
|---|---|---|
| 143,094 | Richardson | Sept. 23, 1873 |
| 267,822 | Barnes | Nov. 21, 1882 |
| 440,763 | Simonds | Nov. 18, 1890 |
| 446,934 | Simonds | Feb. 24, 1891 |
| 897,872 | Brun | Sept. 8, 1908 |
| 1,001,799 | Anderson | Aug. 29, 1911 |
| 1,240,913 | Anderson | Sept. 25, 1917 |
| 1,377,177 | Anderson | May 10, 1921 |
| 1,568,648 | White | Jan. 5, 1926 |
| 1,619,997 | White | Mar. 8, 1927 |
| 1,642,179 | Schurr | Sept. 13, 1927 |
| 1,987,234 | Hill | Jan. 8, 1935 |
| 2,464,658 | Stivin | Mar. 15, 1949 |
| 2,679,089 | Opitz et al. | May 25, 1954 |

FOREIGN PATENTS

| | | |
|---|---|---|
| 258,062 | Switzerland | May 2, 1949 |
| 517,039 | France | Apr. 29, 1921 |
| 839,821 | France | Jan. 7, 1939 |